US007406741B2

United States Patent
Braun

(10) Patent No.: US 7,406,741 B2
(45) Date of Patent: Aug. 5, 2008

(54) WATER-RETENTION COATING FOR A WINDSCREEN WIPER BLADE, WIPER BLADE PROVIDED WITH SAME AND METHOD FOR COATING A BLADE WITH SAME

(75) Inventor: Alexis Braun, Coudes (FR)

(73) Assignee: Valeo Systems d'Essuyage, La Verriere (FR)

( * ) Notice: Subject to any disclaimer, the term of this patent is extended or adjusted under 35 U.S.C. 154(b) by 0 days.

(21) Appl. No.: 10/495,253

(22) PCT Filed: Nov. 14, 2002

(86) PCT No.: PCT/FR02/03905

§ 371 (c)(1),
(2), (4) Date: May 10, 2004

(87) PCT Pub. No.: WO03/042016

PCT Pub. Date: May 22, 2003

(65) Prior Publication Data

US 2005/0004295 A1   Jan. 6, 2005

(30) Foreign Application Priority Data

Nov. 14, 2001 (FR) .................................. 01 14753
Nov. 14, 2001 (FR) .................................. 01 14754

(51) Int. Cl.
*A47L 1/02* (2006.01)
*A47L 1/00* (2006.01)
*B60S 1/04* (2006.01)
*B60S 1/32* (2006.01)

(52) U.S. Cl. ............... 15/250.48; 15/250.361; 15/250.41; 15/245; 427/180; 427/181; 427/358; 427/430.1; 524/451; 106/469

(58) Field of Classification Search ............... 15/250.48
See application file for complete search history.

(56) References Cited

U.S. PATENT DOCUMENTS

| 2,908,028 | A |   | 10/1959 | Runton et al. ................. 15/245 |
| 2,952,865 | A |   | 9/1960 | Rohr et al. ............... 15/250.36 |
| 2,971,209 | A |   | 2/1961 | Coulter ...................... 15/250.4 |
| 3,040,359 | A |   | 6/1962 | Deibel .................... 15/250.36 |
| 3,698,133 | A | * | 10/1972 | Schreiber ..................... 47/57.6 |
| 3,905,152 | A | * | 9/1975 | Loperfido ................... 47/57.6 |
| 4,003,867 | A | * | 1/1977 | Cooper et al. ............... 523/442 |
| 4,045,838 | A |   | 9/1977 | Porter .................... 15/250.36 |
| 4,103,385 | A | * | 8/1978 | Porter .................... 15/250.48 |
| 4,187,192 | A | * | 2/1980 | Sheridan ...................... 516/79 |
| 4,902,767 | A | * | 2/1990 | Roitman et al. ............... 528/28 |
| 5,283,927 | A | * | 2/1994 | Gibbon et al. ........... 15/250.48 |
| 5,716,699 | A |   | 2/1998 | Reo .......................... 428/325 |
| 6,017,582 | A |   | 1/2000 | Desormiere et al. ......... 427/180 |
| 6,175,986 | B1 |   | 1/2001 | Desormiere et al. ...... 15/250.48 |
| 2002/0160203 | A1 | * | 10/2002 | Robertson ................ 428/423.1 |

FOREIGN PATENT DOCUMENTS

EP    0 635 410  A1    7/1993
JP    10-7903          1/1998

OTHER PUBLICATIONS

Patent Abstracts of Japan, publication No. 10-007903, published Jan. 13, 1998 (2 pages).

* cited by examiner

*Primary Examiner*—Joseph D. Anthony
(74) *Attorney, Agent, or Firm*—Osha Liang LLP

(57) ABSTRACT

A coating for a rubber or elastomer wiper blade of a vehicle windscreen wiper, of the type comprising an additive for reducing the coefficient of friction between the blade and the window, characterised in that it comprises cavities with microscopic dimensions which open out outside the coating, which confers a hydrophilic character on it.

11 Claims, No Drawings

WATER-RETENTION COATING FOR A WINDSCREEN WIPER BLADE, WIPER BLADE PROVIDED WITH SAME AND METHOD FOR COATING A BLADE WITH SAME

CROSS-REFERENCE TO RELATED APPLICATIONS

This application is a national stage application based on International Application No. PCT/FR02/03905 filed Nov. 14, 2002.

FIELD OF THE INVENTION

The present invention concerns a coating on a rubber or elastomer wiper blade of a vehicle windscreen wiper, of the type comprising an additive reducing the coefficient of friction between the blade and the window.

The present invention also concerns a solution for producing such a coating.

BACKGROUND OF THE INVENTION

In order to improve the wiping quality obtained by means of a wiper blade, made from natural or synthetic rubber or elastomer, it is known how to provide it with a coating comprising a powder, in particular crystalline carbide in the form of natural or artificial graphite, containing lamellar particles of very small dimensions. These particles have a lamellar structure, which enables them to have a function equivalent to that of a "lubricant" for significantly improving the wiping quality.

It is known how to produce such a coating by means of a solution consisting essentially of a binder, in the form of an acrylic, vinyl or styrene or urethane resin in which the graphite powder is dispersed.

The coating is produced by soaking the blade in the solution or by coating the blade by means of the solution, and then drying.

Such a coating, though it makes it possible to improve the wiping quality, has the drawback of giving rise to certain unpleasant phenomena (turning over, squealing etc) when the glazed surface is not very moist, also referred to as "drying window".

These phenomena are non-existent when the window is wet since a film of water is always present between the window and the wiper blade, and this film of water also acts as a lubricant. In the "drying window" phase or when wiping dry, the absence of the film of water causes an increase in the coefficient of friction between the window and the wiper blade, and hence the unpleasant phenomena.

In addition, such a coating has the drawback of not being able to be coloured because of the presence of graphite. This is because graphite is black in colour and the proportion of graphite in the solution is around 30% by weight. Thus the proportion of pigments necessary for obtaining a colouring of the coating would be too great and might impair the quality of wiping.

SUMMARY OF THE INVENTION

The aim of the invention is to propose a novel coating for lubricating wiper blades which enables a film of water to be retained between the wiper blade and the window, in particular during the start of the "drying window" wiping phase.

DETAILED DESCRIPTION

For this purpose, the invention proposes a coating for a rubber or elastomer wiper blade of a vehicle windscreen wiper, of the type comprising an additive reducing the coefficient of friction between the blade and the window, characterised in that it has a structure which confers a hydrophilic character on it.

According to other characteristics of the invention:
  the coating comprises cavities of microscopic dimensions which open out outside the coating;
  the coating consists of an agglomeration of particles of additive.

The invention also proposes a novel composition for a solution with a view to producing the coating for lubricating the wiper blades for vehicle windscreen wipers, which enables the coating to be coloured.

For this purpose, the invention proposes a solution for producing a coating on a wiper blade, made from rubber or elastomer, of a motor vehicle windscreen wiper, of the type described previously, characterised in that the colour of the additive enables the coating to be coloured.

According to other characteristics of the invention:
  the additive is light in colour;
  the additive is a mineral powder;
  the structure of the additive is lamellar;
  the additive is talc;
  the mean granulometry of the powder is approximately 4 µm;
  the solution is obtained from a predispersion of the additive in water;
  the solution comprises between 20% and 35% talc by weight in dispersion;
  the additive is a fluorinated component;
  the additive is a resin based on polytetrafluoroethylene;
  the additive is based on silicone;
  the additive is a resin;
  the solution also comprises another component for reducing the coefficient of friction between the blade and the window;
  the solution comprises a binding element;
  the solution comprises a wetting agent, a dispersant and a thickening agent;
  it comprises a waterproofing element.

The invention also proposes a wiper blade of a motor vehicle windscreen wiper, characterised in that it is covered with a coating according to the teachings of the invention.

The invention also proposes a method for covering a wiper blade with a coating which reduces the coefficient of friction between the profiled section and a glazed surface, characterised in that a solution is sprayed in order to produce a coating in accordance with the teachings of the invention on the profiled section, and then in that the wiper blade is made to dry.

According to other characteristics of the invention:
  the solution is sprayed by means of a nozzle with an outlet diameter of approximately 0.5 mm and a pressure of approximately 1 bar.

A coating in accordance with the teachings of the invention will now be described.

The coating according to the invention possesses a hydrophilic character, that is to say it can absorb a certain quantity of water.

This hydrophilic character of the coating is obtained by means of its structure, which has cavities.

The coating comprises an additive which improves the quality of the wiping. This additive is a mineral powder, which may be kaolin, calcium carbonate or silica. However, according to a preferred embodiment of the invention, the additive is talc.

In order to produce the coating, an aqueous solution is first of all prepared, and this solution is then applied to the wiper blade, which is then made to dry.

The solution comprises softened water, with a substantially neutral pH.

In order to obtain a colouring of the coating, pigments are incorporated in the solution. These pigments are for example those sold by the company Richard.

The solution is previously obtained from an aqueous predispersion of the additive, this predispersion itself being obtained by adding water to the additive dropwise.

When the additive is talc, the predispersion comprises between 40% and 50% talc by weight. Preferentially, the talc has a mean granulometry of 4 μm.

The talc is for example "Mistrobond RG 20" or "Steamic OOS" sold by the company Talc de Luzenac.

A commercial predispersion, or "slurry", can be used, for example "Helicoat B33" sold by the company Talc de Luzenac.

To ensure the holding, distribution and dispersion of the additive, a wetting agent and thickening agent are used.

The wetting agent is for example "Lumiten PT" sold by the company BASF, and the dispersant can be "Polysalz S" sold by the company BASF.

The resin constituting the binder of the solution, which confers on it its strength after cross-linking when drying is carried out can be acrylic and melamine formaldehyde such as for example "Acrymul 317R" or "Prox ML 370" sold by the company Synthron, it can be vinyl, such as "Primaire 567" sold by the company Prospa, the resin can also be a polyurethane resin such as "Cydrothane 1035" sold by the company Cytec.

A waterproofing additive can be added to enable the coating to resist external attacks and in particular detergents and washing powders.

The waterproofing agent is for example "Dryol PAL" or "WA 491" sold by the company Synthron.

To adjust the viscosity of the solution of emulsion, a thickening agent is incorporated.

The thickening agent can be "Prox A 11" or "Prox A 300" sold by the company Synthron.

These additives make it possible to obtain a coating which has wiping properties similar to coatings based on graphite, with regard to the wiping quality and the service life.

According to another embodiment, the solution is based on the use of fluorinated or silicone resins.

The fluorinated resin is based on polytetrafluoroethylene (PTFE), polyvinyledene fluoride (PVDF) or perfluoroether, such as for example "Synthropel Fox" sold by the company Synthron, or "Fluorlink" from the company Ausimont.

A fluorinated filler in the form of powder can be added to the resin with a view to reducing the coefficient of friction. This filler can be PTFE in dispersion sold by the company Ausimont.

The reduction in the coefficient of friction can be achieved by the addition of a polyethylene such as "Proxamine NP912 GL" sold by the company Synthron.

The use of fluorinated or silicone additives makes it possible to obtain a coating which has properties of resistance to frost and a certain resistance to the adhesion of impurities.

The solution is applied to the wiper blade by spraying by means of a nozzle with an outlet diameter of 0.5 mm and at a pressure of 1 bar.

This spraying method makes it possible to obtain an agglomeration of particles of the additive, after drying, these particles are bound to each other by the resin. However, the resin does not fill in all the interstices between the particles of talc, so that these interstices form the characteristic cavities of the coating, which can behave like a sponge.

When the wiper blade is in the presence of water, these cavities fill with water by capillary attraction. The water is thus retained as long as the window is wet.

In the "drying window" phase, the water is progressively released like a sponge. This makes it possible to preserve a film of water between the wiper blade and the window and therefore to limit the unpleasant phenomena.

Examples of compositions of the coating can be summarised in the following table giving the proportions by weight of the elements of the solution:

| ADDITIVE | WATER | RESIN | LUMITEN | DRYOL PAL | POLYSALZ S | PROX A 300 |
|---|---|---|---|---|---|---|
| 30-40 | 40-50 | 10-15 | 0.1-0.4 | 5-6 | 0.1-0.3 | 0.2-1.5 |
| 20-30 | | 55-80 | 0.1-0.4 | 4-6 | 0.1-0.2 | |
| 20-30 | | 55-80 | 0.1-0.4 | 4-6 | 0.1-0.3 | |
| 30-40 | 45-55 | 10-17 | 0.2-0.5 | 5-7 | 0.1-0.3 | |

Examples of compositions of the solution for producing the coating can be summarised in the following tables giving the proportions by weight of the elements of the solution:

Solution based on fluorinated resin:

| SYNTHROPEL FOX | PTFE IN DISPERSION | WATER | PIGMENT | PROX A 300 |
|---|---|---|---|---|
| 20–35 | | 60–70 | 3 | |
| 20–35 | 25–30 | 30–45 | 1 | 2 |

Solution based on clear mineral additive:

| TALC IN DISPERSION | WATER | RESIN | LUMITEN | DRYOL PAL | POLYSALZ S | PIGMENT | PROX A 300 |
|---|---|---|---|---|---|---|---|
| 30-40 | 40-50 | 10-15 | 0.1-0.4 | 5-6 | 0.1-0.3 | 1.5-4 | 0.2-1.5 |
| 20-30 | | 55-80 | 0.1-0.4 | 4-6 | 0.1-0.2 | 2-3 | |
| 20-30 | | 55-80 | 0.1-0.4 | 4-6 | 0.1-0.3 | 2-4 | |
| 30-40 | 45-55 | 10-17 | 0.2-0.5 | 5-7 | 0.1-0.3 | 1.5-3 | |

The invention claimed is:

1. A motor vehicle windscreen wiper, comprising:
a rubber or elastomer wiper blade; and
a coating on the wiper blade, wherein the coating comprises:
   an additive comprising a mineral powder or talc;
   a pigment;
   a resin;
wherein cavities with microscopic dimensions which open outside the coating confer a hydrophilic character on the coating,
wherein the cavities in the coating are formed by the interstices between the particles of the additive, and
wherein the colour of the additive allows colouring of the coating.

2. A wiper blade of a motor vehicle wiper, the wiper blade comprising:
a rubber or elastomer member; and
a coating on the rubber or elastomer member, wherein the coating comprises:
   an additive comprising a mineral powder or talc;
   a pigment;
   a resin;
wherein cavities with microscopic dimensions which open outside the coating confer a hydrophilic character on the coating,
wherein the cavities in the coating are formed by the interstices between the particles of the additive.

3. A motor vehicle wiper, comprising:
a rubber or elastomer wiper blade; and
a coating on the wiper blade, wherein the coating comprises:
   an additive comprising a mineral powder or talc;
   a pigment;
   a resin;
wherein cavities with microscopic dimensions confer a hydrophilic character on the coating, and
wherein the cavities in the coating are formed by the interstices between the particles of the additive.

4. A method for covering a profiled wiper blade with a coating which reduces the coefficient of friction between a profiled member and a glazed surface, the method comprising:
spraying a solution comprising 30% to 70% water on the profiled member to produce a coating on the profiled member; and
drying the profiled member,
wherein the coating comprises:
   an additive comprising a mineral powder or talc;
   a pigment;
   a resin;
wherein the coating comprises cavities which open outside the coating with microscopic dimensions which confers a hydrophilic character on the coating, and
wherein the cavities in the coating are formed by the interstices between the particles of the additive.

5. The method according to claim 4, wherein the solution is obtained from a predispersion of the additive in water.

6. The method according to claim 4, wherein the solution comprises between 20% and 35% talc by weight in dispersion.

7. The method according to claim 4, wherein the solution comprises another component for reducing the coefficient of friction between the blade and the window.

8. The method according to claim 4, wherein the solution comprises a binding element.

9. The method according to claim 4, wherein the solution comprises a wetting agent, a dispersant and a thickener.

10. The method according to claim 4, wherein the solution comprises a waterproofing element.

11. The method according to claim 4, wherein the solution is sprayed by means of a nozzle with an outlet diameter of approximately 0.5 mm and at a pressure of approximately 1 bar.

* * * * *